United States Patent [11] 3,608,827

| [72] | Inventor | Alan Kinkead |
| | | Los Altos Hills, Calif. |
| [21] | Appl. No. | 840,751 |
| [22] | Filed | July 10, 1969 |
| [45] | Patented | Sept. 28, 1971 |
| [73] | Assignee | W. R. Ames Company |
| | | Milpitas, Calif. |

[54] LINEARLY MOVABLE IRRIGATION SYSTEM
8 Claims, 14 Drawing Figs.

| [52] | U.S. Cl. | 239/184, |
| | | 137/344 |
| [51] | Int. Cl. | B05b 3/18 |
| [50] | Field of Search | 239/184, |
| | | 173, 180, 191, 213, 159, 148; 137/344 |

[56] References Cited
UNITED STATES PATENTS

| 1,079,817 | 11/1913 | Williamson | 239/148 |
| 2,750,228 | 6/1956 | Engel | 239/184 |
| 2,807,500 | 9/1957 | Clayton | 239/180 |
| 3,139,848 | 7/1964 | Welty | 239/159 X |
| 3,349,794 | 10/1967 | Behlen | 137/344 |
| 3,385,315 | 5/1968 | Decoto et al. | 137/344 |
| 3,463,175 | 8/1969 | Rogers | 239/184 X |
| 3,512,714 | 5/1970 | Phelps et al. | 239/159 X |

*Primary Examiner*—M. Henson Wood, Jr.
*Assistant Examiner*—Thomas C. Culp, Jr.
*Attorney*—Owen, Wickersham and Erickson

ABSTRACT: Apparatus for irrigating a field from a stationary supply pipe on the field supplied at one end with water under pressure and having a series of valves located at predetermined spaced-apart intervals along its length. Each valve is operable by an actuating means for releasing water from the supply pipe in an open position and for preventing the release of water in a closed position. A mobile, self-powered main drive unit movable in a direction generally parallel to the supply pipe has an open receiving tank with an outlet connected to a distribution pipe that extends generally perpendicular to said supply pipe and has a series of outlets spaced apart along its length. Means are provided on said main drive unit for opening said valves when they are positioned over the tank of said drive unit as it moves along and thereafter for closing each open valve just before the tank moves away from the open valve, thereby maintaining the tank in a filled condition as the apparatus moves along with the water being pumped through and sprayed from the distribution pipe in a predetermined manner.

FIG_1

INVENTOR
ALAN KINKEAD

FIG_4

FIG_5

FIG_6

INVENTOR.
ALAN KINKEAD
BY
Owen, Wickersham & Erickson
ATTORNEYS

FIG_7

FIG_11

FIG_8

FIG_9        FIG_10

INVENTOR.
ALAN KINKEAD
BY
Owen, Wickersham & Erickson
ATTORNEYS

FIG_12

FIG_13

INVENTOR.
ALAN KINKEAD

FIG_14

LINEARLY MOVABLE IRRIGATION SYSTEM

This invention relates to apparatus for irrigating land by sprinkling and more particularly to that type of apparatus wherein a series of sprinkling heads are mounted on a distribution pipe that moves laterally over the ground.

In one well-known type of irrigation system, a distribution pipe with sprinkler heads or nozzles is connected to and rotates or pivots about a central upright pipe. Water is supplied to the central pipe and flows out through the distribution pipe as it sweeps over a circular precipitation pattern. While such rotating systems have been widely used they have many disadvantages, the most obvious of which is the limitation of the circular precipitation pattern that prevents full coverage of rectangular field areas.

To overcome the circular limitations, systems were devised wherein a distribution pipe with sprinkler heads was moved linearly over the ground. However, the use of such systems prior to the present invention was limited largely because of the problem of supplying water to the moving distribution pipe. Heretofore, a flexible conduit from a water-supply source was attached to the distribution pipe and as the pipe moved over the ground it was necessary to carry or drag along the flexible conduit. This proved to be inefficient and expensive because the flexible conduit required extra equipment and manpower to handle it as well as additional ground area over which it could be dragged or transported without damaging crops.

One object of the present invention is to overcome the disadvantages and problems of prior art irrigation apparatus and provide an improved sprinkler type irrigation apparatus utilizing a linearly moving distribution pipe that does not require a flexible conduit for supplying water to it.

In accordance with the present invention a movable distribution pipe is connected to a self-powered drive unit adapted to move adjacent to a fixed supply conduit. The drive unit has a receiving tank and a means for first opening and then closing each of a series of valves controlling hydrants spaced apart along the fixed conduit. As the drive unit and the attached distribution pipe move along at a steady rate each valve is opened to feed water into the receiving tank as the tank moves to a position beneath the hydrant. From the tank, the water is continuously pumped through the distribution pipe and its sprinkler outlets. As the drive unit moves away from each open valve, it is automatically closed.

The distribution pipe is made up of connected sections which are supported by structural trusses connected at their ends to separately powered drive units. All of these drive units can be controlled from the central drive unit or by an automatic control system which operates to keep the connected truss sections aligned. Since the supporting drive units move in a predetermined path, the sprinkler heads can be positioned on the distribution pipe and set to avoid these paths, thereby keeping them free from mud as the apparatus moves along.

It is, therefore, another object of the present invention to provide a sprinkler-type irrigation apparatus comprised of a distribution pipe that moves linearly over the ground and receives water from a series of valves in a fixed supply pipe that are first opened and then closed as the apparatus moves along.

Another object of the invention is to provide an irrigation apparatus utilizing a linearly moving distribution pipe for producing a rectangular precipitation pattern that is supported at widely spaced-apart locations by individually controllable self-powered drive units.

Other objects of the present invention are to provide an irrigation apparatus that is adaptable to fully automatic operation; that will provide a consistent repeatable precipitation pattern over a large area; that is durable, reliable, economical in its operation and that is easy to service and maintain.

Other objects, advantages and features of the present invention will become apparent from the following detailed description of one embodiment thereof presented in accordance with 35 U.S.C. 112 and in conjunction with the following drawings, in which:

FIG. 2 is an enlarged side view in elevation of the main drive unit of the apparatus shown in FIG. 1;

FIG. 3 is a plan view of the main drive unit shown in FIG. 2;

FIG. 4 is an end view in elevation of the apparatus of FIG. 2;

FIG. 5 is a fragmentary plan view of the connecting structure between the main drive unit and the supporting truss for the distribution pipe;

FIG. 6 is a view in elevation of the connecting structure of FIG. 5;

FIG. 7 is an enlarged fragmentary view of the supply conduit showing the trolley thereon and an outlet valve being actuated to the open position;

FIG. 8 is a view in section taken along line 8—8 of FIG. 7;

FIG. 9 is an enlarged view in section of one outlet valve for the supply conduit;

FIG. 10 is an enlarged fragmentary side view of the outlet valve showing the open position of the cam ring in phantom;

FIG. 11 is a somewhat small view in perspective of the cam ring for the outlet valve of FIGS. 9 and 10;

FIG. 12 is a view in side elevation of an auxiliary drive unit according to the invention;

FIG. 13 is a view in end elevation of the auxiliary drive unit of FIG. 12; and

Figure 1:
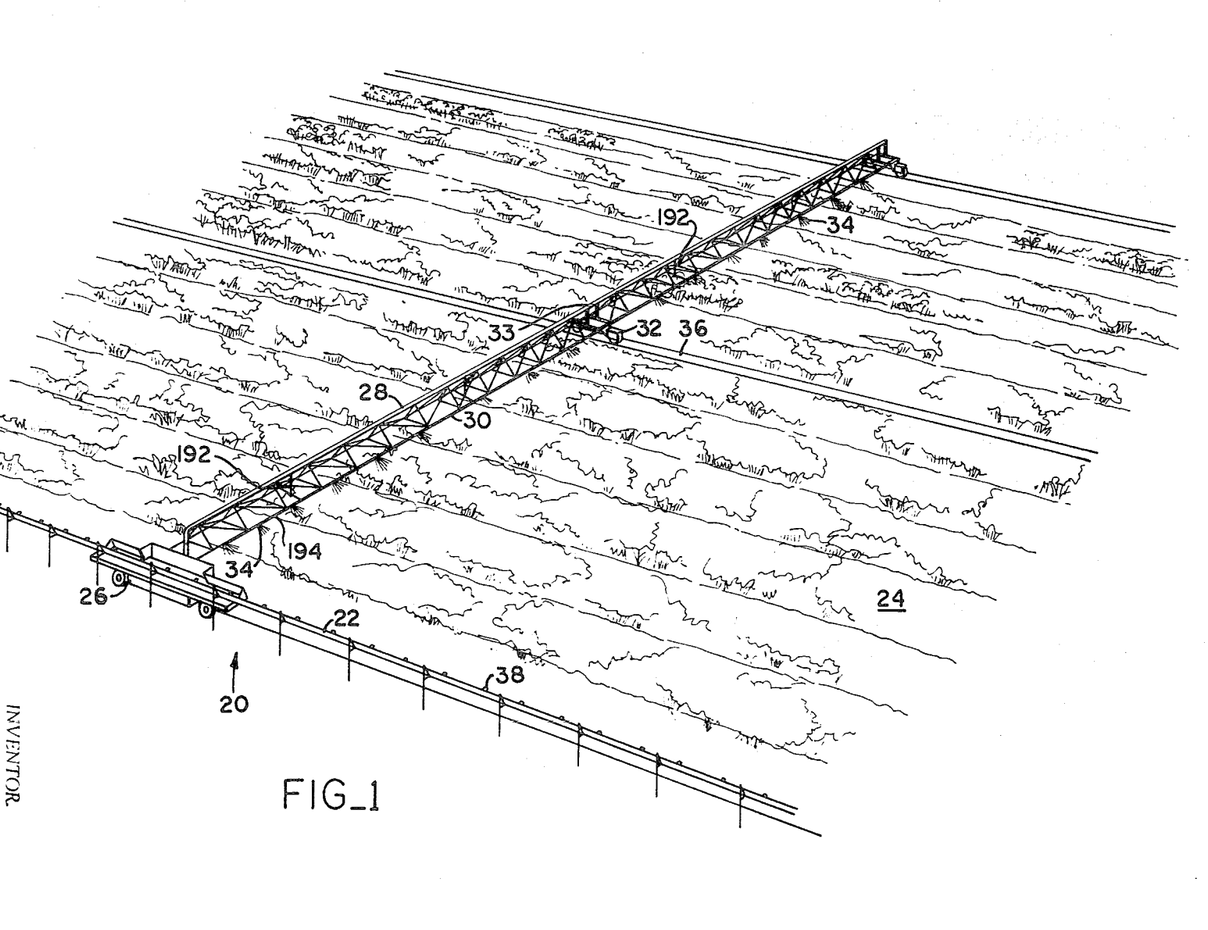
FIG. 1 is a view in perspective showing an irrigation apparatus embodying the principles of the present invention.

Referring to the drawing, FIG. 1 shows an apparatus 20 embodying the principles of the present invention as it appears when operating to irrigate a field. Generally, it comprises a water-supply conduit 22 that is fixed in position and supported above the ground level in a field 24 to be irrigated, one end being closed and the other connected to a source of water that keeps the conduit under pressure. Cooperating with the supply conduit and adjacent to it is a moving main drive unit 26 that also supports one end of a distribution pipe 28. The latter, extending substantially perpendicular to the fixed conduit and out over the field is supported by a series of pivotally connected truss sections 30. These sections are mounted on spaced-apart auxiliary drive units 32. Mounted on the distribution pipe are a plurality of risers or sprinkler heads 34 of any suitable type capable of spraying water at a predetermined rate and pattern.

Spaced apart along the fixed supply conduit 22 are a series of hydrants, each with a valve 38 which is actuated by a trolley device on the main drive unit 26 to open and then close as the main drive unit and the distribution pipe move along. The main drive unit has a receiving tank 40 which is positioned to receive water from the hydrant outlet as its valve 38 is opened. The tank has an outlet connected to the distribution pipe. Thus, the distribution pipe is constantly supplied with water as it moves over the field without the necessity of dragging a flexible supply conduit.

One preferred embodiment of the apparatus 20 according to the present invention will now be described with reference to the more detailed drawings. The main drive unit 26, as shown in FIGS. 2 to 4, comprises a frame or chassis 42 supported on a pair of steerable front wheels 44 and a pair of steerable rear drive wheels 46. The rear wheels may be driven by any suitable power source that will provide a constant smooth and reversible driving torque. In the arrangement shown, an internal combustion engine and generator unit 48 supplies power to an electric motor variable drive unit 50 whose output shaft is connected by a chain 52 to a speed reducer or gearbox 54. The output of the reducer is connected by another chain 56 to a worm 58 that drives a worm gear 59 and another shaft 60 at right angles to the worm gear. The latter shaft is connected by yet another chain 62 to the final drive shaft 64 which connects to the driving axles of the rear wheels 46 in a standard differential gearbox 66. The power train, as described, provides for a large gear reduction so that adequate driving torque at the very low speed required for the main drive unit can be realized at the wheels with a relatively low amount of horsepower. The electric motor variable drive unit 50 is particularly adaptable for propelling apparatus because it provides a shaft output whose speed is easily and quickly controllable while the motor generator unit operates at a constant rate. While the aforesaid is particularly efficient for my apparatus, it should be understood that other driving or power systems could be provided, and the present invention is not limited by the particular power shown and described.

Supported on the chassis of the main drive unit is the receiving tank 40 which may be made from sheet metal. It has an elongated portion 41 on one side that extends outwardly from the side of the chassis near the main supply pipe 22 and a shorter portion nearer the center of the chassis. Near the bottom of the shorter tank portion is an outlet fitting 68 that extends through the wall of the tank and connects with the inlet to a centrifugal pump 70. The pump is driven by its own power unit such as a small internal combustion engine 72, and its outlet 74 is connected through a check valve 76 in an upright fitting and then upwardly through a gate valve 78 and a conventional pilot-operated float valve 80. The latter is operable by means of a float (not shown) to control the rate of flow from the tank in proportion to the amount of water in it. In other words, if the tank is getting too full the float valve will open to increase the flow from the pump and vice versa. Above the float valve an upright conduit 82 is connected to a hose section that turns 90° and connects with the movable distribution pipe 28.

The main drive unit 26 is connected to the supply pipe 22 by a trolley type assembly which guides the drive unit and operates to open each of the valves 38 along the supply pipe when the tank 40 is positioned below its outlet or hydrant. As shown in FIGS. 2–4, this trolley assembly includes a channel member 84 that extends generally parallel to the longitudinal axis of the drive unit. Attached to this channel near its opposite ends are a pair of rotatable trolley wheels 86 each having an annular recess with a radius of curvature equal to the radius of the supply pipe 22. Each trolley wheel is mounted on the end of a rod 88 that extends horizontally through the channel and also curves downwardly below the channel terminating at its lower end on the opposite side of the supply pipe from the channel member 84. The lower ends of the rods 88 are fixed to a stabilizing member 90 which is parallel to the channel member 84 and provides a counterbalancing weight to help hold the trolley wheels on the supply pipe. Attached to and extending horizontally at right angles from the channel member 84 and over the main drive unit 26 are a pair of parallel spaced-apart beam members 92. As shown in FIGS. 5 and 6, each of the latter beam members at their outer end extends between a pair of horizontal steel guide rods 94. A pair of these guide rods are spaced apart vertically on each of two spaced-apart upright posts 96 by an amount that is slightly greater than the width of the beam members 92. Attached to each upright post between the guides 94 is a relatively short piece of curved pipe 98 which is convex with respect to the adjacent beam member, thereby providing a surface along which the beam member can pivot smoothly. The upright posts 96 are mounted at their lower ends on a channel that forms an end frame member 100 of a truss section 30 for supporting the distribution pipe. Fixed to this end frame member between the upright posts 96 and extending downwardly is a vertical pin 102 that fits within a horizontal frame member 104 fixed to the drive unit chassis 42, thereby pivotally connecting the end of the truss section 30 to the main drive unit 26. With the aforesaid arrangement, the truss section 30 terminating at the frame member 100 is free to pivot from its normal position relative to the supply pipe 22 without tending to pull the trolley wheels 86 off of the supply pipe, and it also allows the main drive unit to vary from a path precisely parallel with the supply pipe without affecting the trolley.

An automatic steering control is provided to keep the main drive unit moving in parallel alignment with the supply pipe. As shown in FIG. 4 this steering-control linkage on the front wheels 44 comprises a horizontal arm 106 fixed at its outer end to the channel 84. At its inner end the horizontal arm is pin connected to the upper end of an upright pivot arm 108. The latter is pivotally connected near its lower end to a bracket 110 fixed to a front frame member 112 on which the front wheels 44 are pivotally mounted. A steering bar 114 is pivotally connected at each end to a link 116 that is fixed to the wheel, so that longitudinal movement of the steering bar causes the wheels to turn. A link 118 is pivotally connected at one end to the steering bar and at its other end to the upright pivot arm 108, either above or below the pivot connection to the bracket 110, depending on which direction the steering correction is desired. For example, in FIG. 4, the link 118 is connected to the bottom end of the upright pivot member 108. Thus, if the drive unit tends to move away from the supply pipe 22 the upright pivot member 108 will pivot counterclockwise about the bracket connection 110 and the link 118 will move the steering bar 114 to the right. This will turn the wheels 44 in the opposite direction toward the supply pipe, thereby steering the main drive unit back parallel to the supply pipe to correct the misalignment of the main drive unit. A similar steering linkage is provided for the rear wheels 46. Since its components and operation are similar to those shown for the front wheels, it need not be described in detail.

As stated in the general description, the main drive unit automatically opens and closes valves in the supply pipe as it moves along beside it. One form of the valve 38 that is particularly adaptable for use with my system is shown in FIGS. 8 to 11. The valve itself is the simple plunger type, utilizing a piston 120 attached to a closure plate 122 that is movable axially from an open position away from an opening 124 through the pipe to a closed position covering the opening. The piston is mounted in a housing 126, attached to the side of the pipe and it is actuated by a cam ring 128 located around the housing. The cam ring has a bottom edge 130 that bears against an annular ring 132 threaded to the housing. Its top edge is a series of four circumferentially spaced-apart cam surfaces 134, separated by relatively short flat surfaces 136. Attached to the outer surface of the cam ring and extending radially therefrom just below the center of each of the curved surfaces are four arms 138. In the housing 126 are a pair of diametral slots 140 through which a transverse rod 142 extends. This rod also extends through the end of the piston 120, and attached to each end is a rotatable, cylindrical sleeve 144 that engages the inner edge of the cam ring. It is readily seen from the foregoing that a rotational force applied to the cam ring will provide a camming force on the rod 142 and thus on the piston 120, thereby opening or closing the valve. An actuating arm 146 extending downwardly from a bracket 148 fixed to the trolley channel 84 provides this valve-actuating force as the main drive unit moves along. As shown in FIG. 7, this actuating arm is located so that it engages a radial arm 138 on the cam ring to rotate the latter and open the valve 38 just as the tank 40 is positioned below the valve. This valve now feeds water to the tank until another actuating arm 146a near the other end of the channel 84 closes the valve by engaging another radial arm 138 in the same manner.

Figure 14:
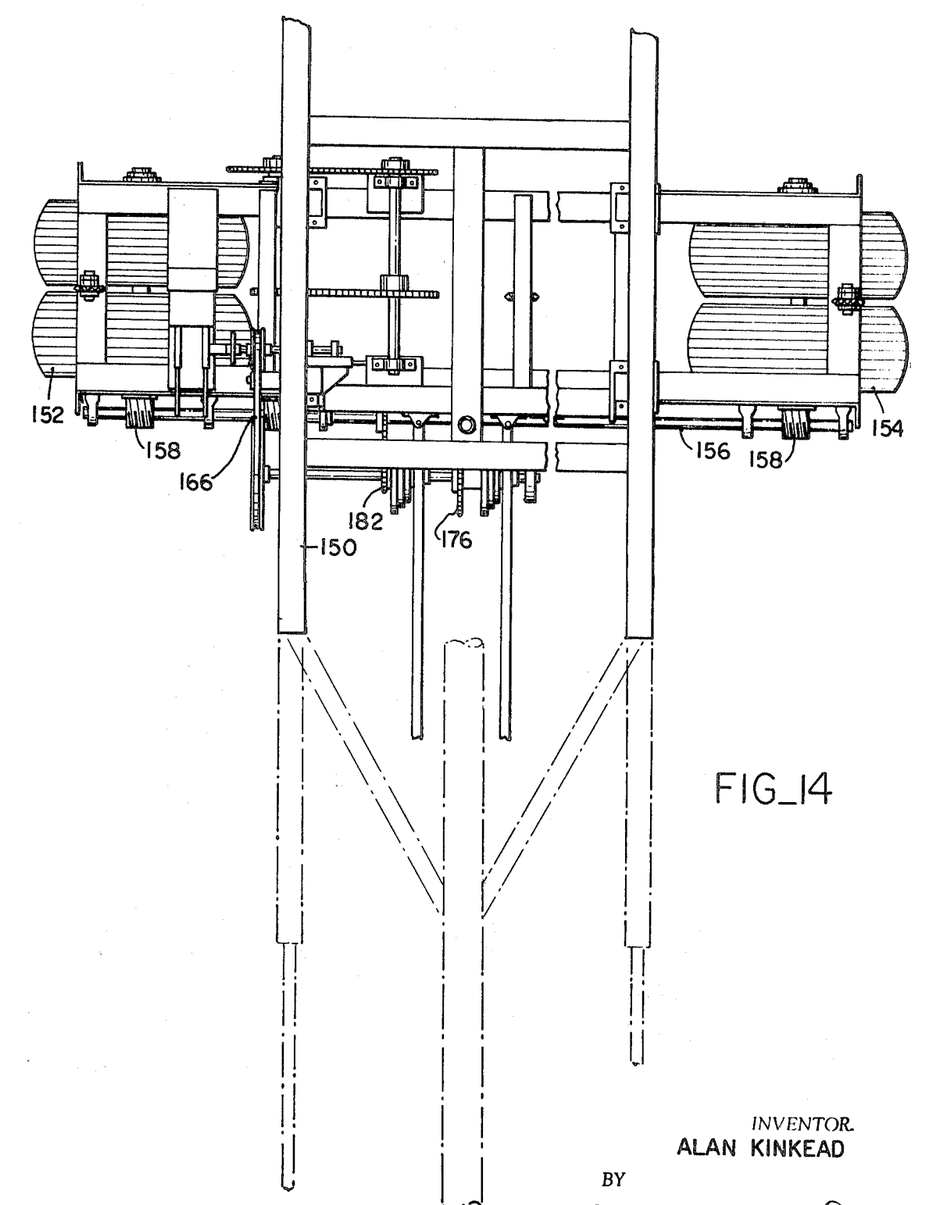
FIG. 14 is a plan view of the auxiliary drive unit of FIG. 13.

The distribution pipe 28 is supported on a series of structural truss sections 30 which are fixed at one of their ends to an auxiliary drive unit 32. The other end of each truss section is pivotally connected to the auxiliary drive unit of the adjoining truss section by means of a pin 102a, as shown in FIGS. 13 and 14 and in generally the same manner that the first truss section is connected to the main drive unit. The distribution pipe 28 is comprised of a series of pipe sections, each of which is supported at the top of its truss sections, and at each auxiliary drive the distribution pipe sections are connected by a suitable flexible coupling 33 that allows some misalignment of adjoining sections. The geometric pattern or structural details of the truss sections will not be described herein since various suitable truss sections constructed in accordance with well-known engineering principles may be used within the scope of the invention.

Each auxiliary drive unit 32, shown in FIGS. 12 to 14, comprises a frame 150 supporting wheels 152 and 154 spaced apart in a bicycle arrangement. Each wheel is preferably a dual tire assembly in order to reduce the pressure per unit area of the entire apparatus on the ground. A shaft 156 mounted on the frame has a pair of worm gear segments 158 near both ends, each of which meshes with a circular gear 160 fixed to a wheel. The drive train for turning the shaft 156 originates from an electric motor-speed reducer unit 162 whose output shaft 164 is connected by a belt 166 to a larger pulley on a shaft 168 which is parallel to the main drive shaft 156. On the shaft 168 are a pair of gripping clutches 170 and 172 which are engageable alternatively with the shaft by suitable control handles (not shown). Attached by means of a sleeve to one clutch is a relatively large sprocket 174 which is connected by a chain 176 to a sprocket 178 fixed on the drive shaft 156. The other clutch is attached by a coupling hub to a relatively small sprocket 180 that is connected by a chain 182 to another sprocket 184 fixed to the drive shaft. The two clutches thus provide alternate gear ratios and speed ranges which can be selected depending on which clutch is engaged.

The supporting truss sections 30 are normally in alignment and move in a direction parallel to the supply pipe 22 at a constant speed which is the same as the speed of the main drive unit 26. For various reasons such as slippage of the wheels on the ground the individual drive units 32 may move at slightly different rates and thereby cause some temporary misalignment of the truss sections. To correct this misalignment as it occurs, my apparatus is preferably provided with an alignment control system such as shown in U.S. Pat. No. 3,587,763 issued June 28, 1971.

The risers or sprinkler heads 34 fed by water supplied to the distribution pipe 28 may be connected thereto in various ways within the scope of the invention. For example, in one preferred arrangement, shown in FIG. 1, a series of downwardly extending inverted "T" conduit sections 192 are connected at predetermined spaced-apart locations to each section of the distribution pipe. At the outer ends of the transverse member of each inverted "T" section is a smaller pipe 194 which is parallel to the distribution pipe 28 and to which are connected the risers 34. These smaller pipes may be secured to the lower stringers of the truss section, and thus the risers 34, which produce a constant spray pattern are located relatively close to the ground. Various types of risers may be used depending on various factors such as the soil characteristics and the crop being irrigated. Preferably the risers are capable of producing a relatively small, predictable ground pattern and they are mounted so that the pattern produced avoids the track 36 which the main and auxiliary drive units 32 must make through the field. Thus, these tracks remain completely dry at all times and no mud is created which can interfere with the efficient operation of the apparatus. The ground irrigation pattern is preferably as shown in U.S. Pat. No. 3,587,763 issued June 28, 1971.

The operation of my apparatus 20 is relatively simple and should be readily apparent from the foregoing description. With water supplied to the main supply pipe 22 extending along a field, the main drive unit 26 can be energized and started along a line parallel to the supply pipe and at a constant speed. The speed will be set in accordance to various factors including the condition of the soil and the crop, the type of risers or nozzles 34 being used and other factors. As the main drive unit moves along, the leading arm 146 on the trolley assembly engages a radially extending valve arm 138 and rotates the cam ring 128 to open the valve 38. Water is thus supplied to the tank and to the pump 70 from which it flows through the upright outlet pipe 82 to the distribution pipe 28. The tank is long enough so that several valves may be open simultaneously, and each is closed by the trailing actuator arm which engages the radial arm on the cam ring of the valve. As the main drive unit proceeds down along the supply pipe, the distribution pipe is kept in alignment by the control of the auxiliary drive units as previously described. When the apparatus reaches the end of the field it can either be reversed to commence travel in the opposite direction, and all the components will operate in the same manner but in reverse order. Alternatively, the apparatus 20 can be moved back to its starting position without irrigating at a fairly rapid rate, if that is desired.

Although I have described and illustrated a drive unit with a distribution pipe extending therefrom in only one direction, it is possible that I may extend the distribution pipe in both directions from opposite sides of the supply conduit. Also, although I have shown an apparatus with only a few truss sections, it is possible, within the scope of the invention to extend the distribution pipe for many such sections.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. Apparatus for irrigating a field comprising:
a stationary supply pipe located along the field and supplied with water under pressure;
a series of hydrants located at predetermined spaced-apart intervals along said supply pipe and a valve for each said hydrant, each said valve being operable to an open position for releasing water from the supply pipe through its hydrant and for preventing the release of water from the supply pipe in a closed position;
a mobile main drive unit including power means for moving it generally parallel to said supply pipe, a receiving tank on the drive unit having an open upper end an outlet and a pump at said outlet;
a distribution pipe connected to said pump and extending from said supply pipe;
means for supporting said distribution pipe generally horizontally as it moves along above the ground;
a series of sprinkler outlets connected to and spaced-apart along said distribution pipe;
and means on said main drive unit for opening each said valve when its hydrant is positioned to discharge onto said tank as said drive unit moves along and thereafter for closing each said open valve as said receiving tank moves away from the open hydrant.

2. The apparatus as described in claim 1 wherein each said valve on said supply pipe comprises a closure member movable from an open to a closed position, a cam means, means engaged by said cam means for moving said closure member, and actuator means attached to said cam means for activating said cam means in response to movement of said main drive unit.

3. The apparatus as described in claim 1 including steerable wheels on said main drive unit; means interconnecting said supply pipe and said steerable wheels for moving them automatically to correct any deviation of said main drive unit away from a line parallel to said supply pipe.

4. The apparatus as described in claim 1 including a trolley assembly providing a moving interconnection between said main drive unit and said supply pipe, said trolley assembly including a beam member, a plurality of wheels rotatably mounted on said beam member for constantly engaging said supply pipe as the apparatus moves along and a pair of spaced-apart guide beams attached to and extending from said longitudinal beam member, and guide support means on said main drive unit for supporting the outer free ends of said guide beams while allowing a range of lateral movement between said main drive unit and said supply pipe.

5. The apparatus as described in claim 1 including a control means in said tank for increasing the output of said pump when the water in the tank rises to a predetermined level and for decreasing the pump output when the water goes below a predetermined level.

6. The apparatus as described in claim 1 wherein said means for supporting said distribution pipe comprises a plurality of elongated truss sections including an innermost truss section pivotally connected at one end to said main drive unit, and an auxiliary drive unit pivotally connected to one end of each said truss section.

7. The apparatus as described in claim 6 wherein each said auxiliary drive unit comprises a frame, a pair of wheels mounted on said frame and spaced apart along a line perpendicular to the longitudinal axis of the distribution pipe, power means on said frame and a power-drive train interconnecting said power means and said wheels.

8. The apparatus as described in claim 7 wherein said power means on said main drive unit and said auxiliary drive units include electrical drive motors.